(12) United States Patent
Iyer et al.

(10) Patent No.: US 10,467,156 B1
(45) Date of Patent: Nov. 5, 2019

(54) SYSTEM AND METHOD OF IMPROVING EFFICIENCY IN PARALLEL DATA PROCESSING OF A RAID ARRAY

(71) Applicant: DELL PRODUCTS, LP, Round Rock, TX (US)

(72) Inventors: Shyamkumar T. Iyer, Austin, TX (US); Srikrishna Ramaswamy, Austin, TX (US); Anirban Kundu, Bangalore (IN)

(73) Assignee: Dell Products, LP, Round Rock ( * ) Notice: Subject to any disclaimer, the term of this patent is extended or adjusted under 35 U.S.C. 154(b) by 0 days.

(21) Appl. No.: 16/228,571

(22) Filed: Dec. 20, 2018

(51) Int. Cl.
  *G06F 13/16* (2006.01)
  *G06F 11/10* (2006.01)
  *G06F 13/42* (2006.01)

(52) U.S. Cl.
  CPC ...... *G06F 13/1668* (2013.01); *G06F 11/1096* (2013.01); *G06F 13/4282* (2013.01); *G06F 2213/0026* (2013.01)

(58) Field of Classification Search
  None
  See application file for complete search history.

(56) References Cited

U.S. PATENT DOCUMENTS

2018/0284996 A1* 10/2018 Guim Bernat ........ G06F 3/0613

* cited by examiner

*Primary Examiner* — Idriss N Alrobaye
*Assistant Examiner* — Dayton Lewis-Taylor
(74) *Attorney, Agent, or Firm* — Larson Newman, LLP

(57) ABSTRACT

An information handling system includes a processor configured to write a first command stride and a second command stride. Each of the first command stride and the second command stride includes logical commands in a single queue, and each of the logical commands is mapped for processing by a peripheral component interconnect express (PCIe). An accelerator may perform a logical separation of the logical commands based on the mapping of each logical command, wherein the logical commands are processed in parallel by the PCIe drives.

20 Claims, 4 Drawing Sheets

SYSTEM AND METHOD OF IMPROVING EFFICIENCY IN PARALLEL DATA PROCESSING OF A RAID ARRAY

CROSS REFERENCE TO RELATED APPLICATIONS

Related subject matter is contained in co-pending U.S. patent application Ser. No. 16/227,710 entitled "Apparatus and Method for Reducing Latency of Input/Output Transactions in an Information Handling System using No-Response Commands," filed of even date herewith, the disclosure of which is hereby incorporated by reference.

Related subject matter is contained in co-pending U.S. patent application Ser. No. 16/228,566 entitled "System and Method for Accelerating Performance of Non-Volatile Memory RAID Stacks," filed of even date herewith, the disclosure of which is hereby incorporated by reference.

FIELD OF THE DISCLOSURE

This disclosure generally relates to information handling systems, and more particularly relates to improving efficiency in parallel data processing of a redundant array of independent disks (RAID) array.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may write a first command stride and a second command stride. Each of the first command stride and the second command stride may include logical commands in a single queue, and each of the logical commands may be mapped for processing by a peripheral component interconnect express (PCIe). An accelerator may perform a logical separation of the logical commands based on the mapping of each logical command, wherein the logical commands are processed in parallel by the PCIe drives.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
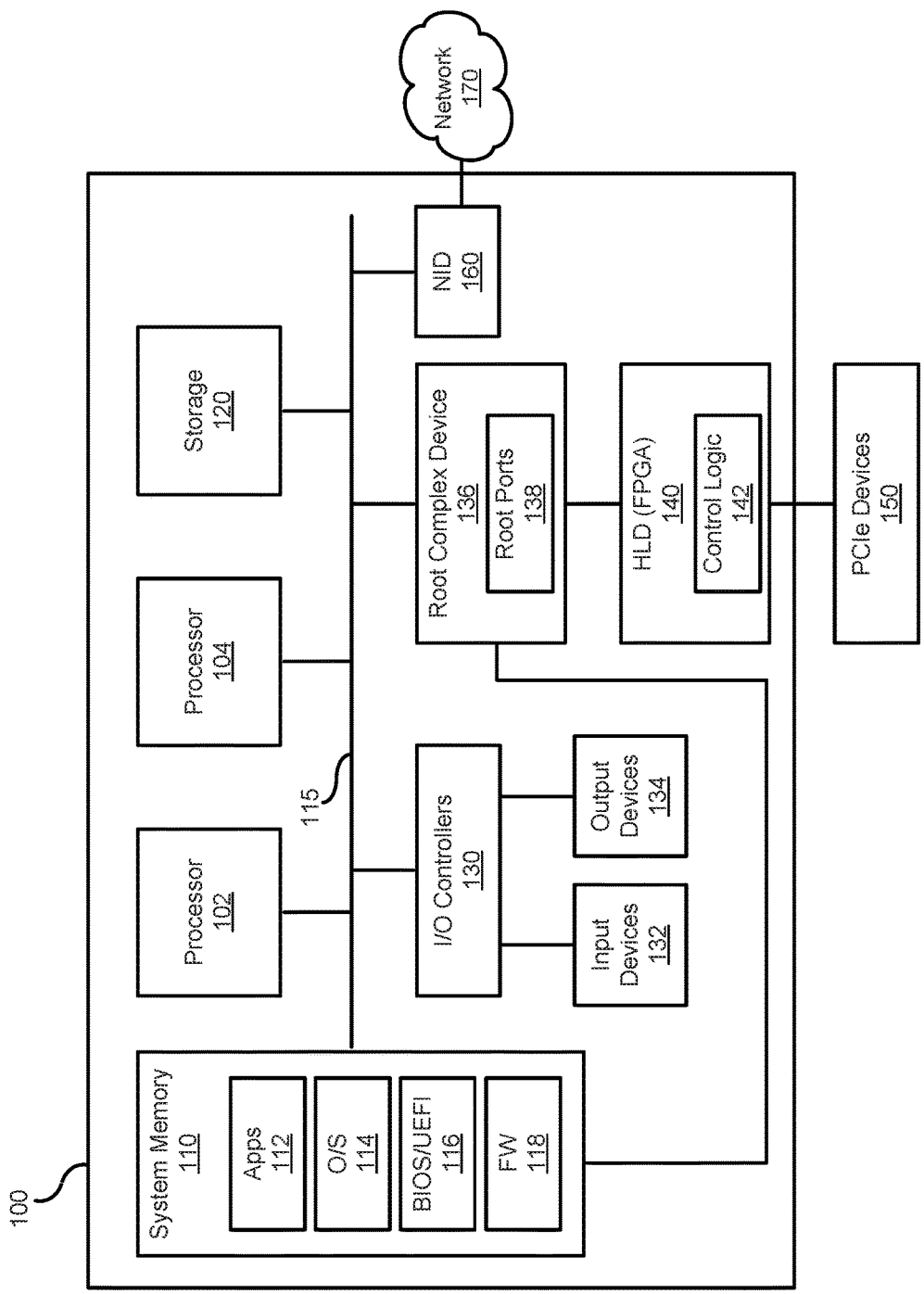
FIG. 1 is a block diagram of an information handling system configured to communicate with peripheral component interconnect express (PCIe) devices, according to an embodiment of the present disclosure.

FIG. 1 illustrates an information handling system (IHS) 100, within which one or more of the described features of the various embodiments of the disclosure can be implemented. For purposes of this disclosure, the information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system can be a personal computer, a laptop computer, a smart phone, a tablet device or other consumer electronic device, a network server, a network storage device, a switch router or other network communication device, or any other suitable device and may vary in size, shape, performance, functionality, and price. Furthermore, the information handling system can include processing resources for executing machine-executable code, such as a central processing unit (CPU), a programmable logic array (PLA), an embedded device such as a System-on-a-Chip (SoC), or other control logic hardware. Information handling system can also include one or more computer-readable medium for storing machine-executable code, such as software or data. Additional components of information handling system can include one or more storage devices that can store machine-executable code, one or more communications ports for communicating with external devices, and various input and output (I/O) devices, such as a keyboard, a mouse, and a video display. Information handling system can also include one or more buses operable to transmit information between the various hardware components.

The IHS 100 includes one or more processors, such as processor 102 and 104, coupled to system memory 110 via system interconnect or bus 115. Also coupled to system interconnect 115 is storage 120 within which can be stored one or more software and/or firmware modules and/or data. In one embodiment, the storage 120 can be a hard drive or a solid state drive. Modules within the storage 120 can be loaded into system memory 110 during operation of the IHS 100. As shown, system memory 110 can include multiple software and/or firmware modules including application(s) 112, operating system (OS) 114, basic input output system/unified extensible firmware interface (BIOS/UEFI) 116 and firmware (FW) 118. In one or more embodiments, BIOS/UEFI 116 includes the additional functionality associated with UEFI and can include UEFI images and drivers. The various software and/or firmware modules have varying functionality when their corresponding program code is executed by processors 102 and/or 104 or other processing devices within IHS 100.

IHS 100 further includes one or more I/O controllers 130 which support connection by, and processing of signals from, one or more connected input device(s) 132 such as a keyboard, mouse, touch screen, or microphone. I/O controllers 130 also support connection to and forwarding of output signals to one or more connected output devices 134, such as a monitor, display device or audio speaker(s).

IHS 100 further includes a root complex device 136 that is coupled to the system interconnect 115 and system memory 110. The IHS 100 further includes a hardware logic device (HLD) or inline accelerator such as a field programmable gate array (FPGA) 140. In other embodiments, the HLD may be an application specific integrated circuit (ASIC) or other type of integrated circuits (IC). Root complex device 136 has several root ports 138. Root complex device 136 is coupled to FPGA 140, and also connects the processor 102 and system memory 110 to a peripheral component interconnect express (PCIe) fabric. Root complex device 136 can support several PCIe root ports 138. The root ports are connected to an endpoint device via FPGA 140. Root complex device 136 generates transaction requests for processor 102, transmits packets through root ports 138, and receives packets from root ports 138. The received packets are then forwarded to system memory 110 or processor 102.

FPGA 140 supports connection to and processing of signals from two or more connected PCIe devices 150. FPGA 140 includes hardware control logic 142 that can perform one of more of the methods described herein. In one embodiment, PCIe device(s) 150 can include graphic processing units and storage devices that are connected via a PCIe endpoint. Storage devices may include solid state drives, such as non-volatile memory express (NVMe) devices. FPGA 140 is coupled to root complex device 136. FPGA 140 supports transmission of data to and from PCI devices 150.

In an embodiment, the PCIe devices 150 are configured as a RAID array. In this embodiment, each PCIe device is treated as a PCIe drive and the PCIe device is interchangeably hereinafter referred to as the PCIe drive. Furthermore, each PCIe drive may support at least one queue that may process a command written by the processor. In an embodiment, a total of "n" number of PCIe drives may be advertised by the FPGA 140 to the processor 102 where "n" is an integer number.

IHS 100 further includes a network interface device (NID) 160. NID 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. Network 170 is indicated as a single collective component for simplicity. However, it is appreciated that network 170 can include one or more direct connections to other devices as well as a more complex set of interconnections as can exist within a wide area network, such as the Internet.

Figure 2:
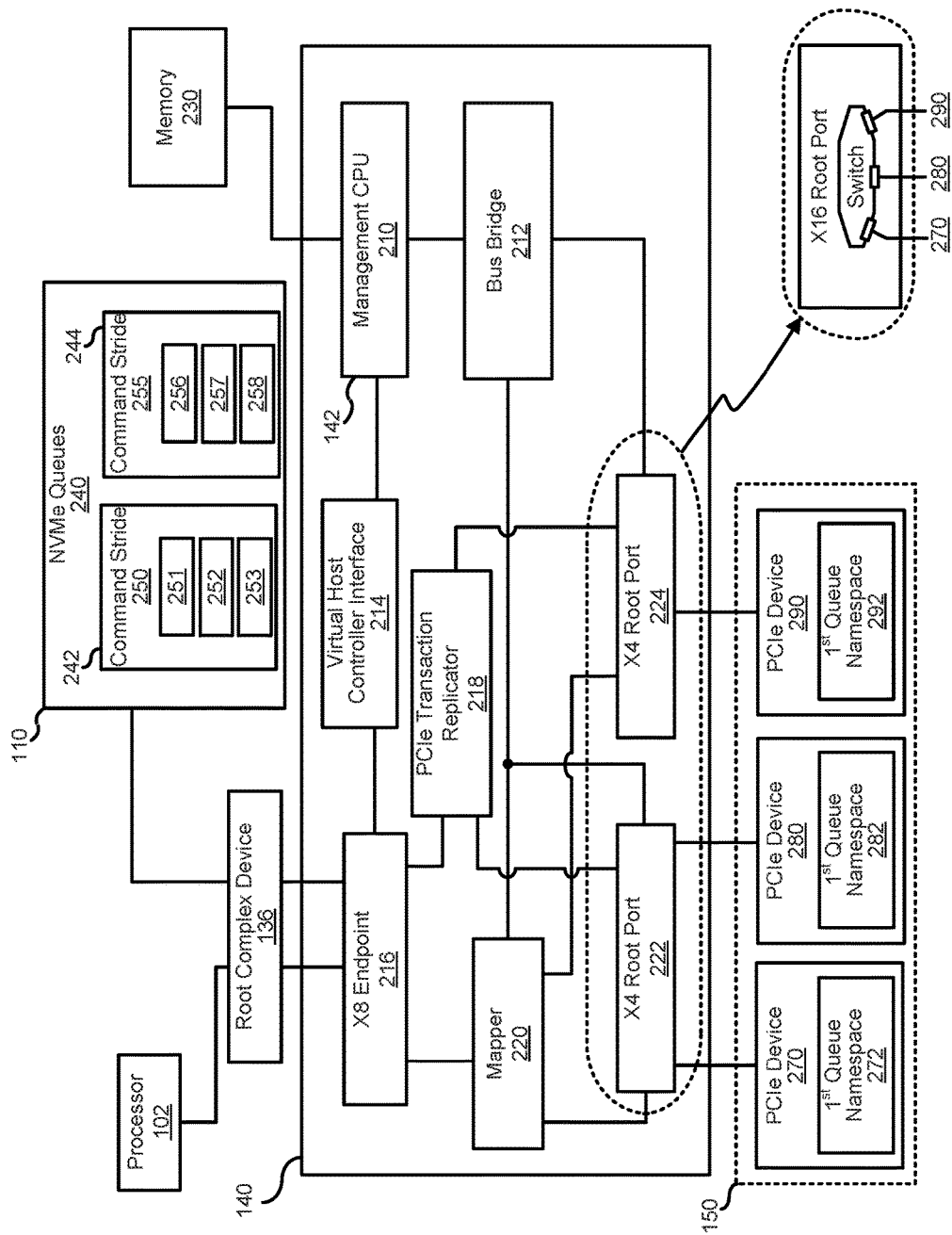
FIG. 2 is a block diagram of a field programmable gate array (FPGA) that facilitates an increase in efficiency during input/output (I/O) operations between a processor and devices, according to an embodiment of the present disclosure.

FIG. 2 shows a block diagram of the FPGA 140 that facilitates an increase in the efficiency of I/O transactions in the RAID array of the IHS. The processor may use different endpoints when writing commands to target the different drives; however, the use of the multiple endpoints for targeting the different drives increases the latency in the I/O operations of the IHS. Furthermore, when the targeted different drives are processing the written commands in parallel, the efficiency of the IHS I/O operations decreases.

In an embodiment, the FPGA is configured to use a single PCIe endpoint when advertising the different drives to the processor. In this embodiment, the FPGA is aware that the advertised different drives may include namespace addresses that are logically different from one another and yet the FPGA advertises them as one set of "n" PCIe drives to the processor. The processor sees the single PCIe endpoint and writes a command stride in a single submission queue slot. Although written in the single submission queue slot, the command stride may be directed to and processed by multiple PCIe drives such as the advertised "n" PCIe drives. In an embodiment, the command stride includes a group of "n" logical command entries that are indexed in the single queue or submission queue slot. Each logical command entry may be mapped by the processor to target a particular drive in the "n" PCIe drives by using the namespace address associated with the drive. In this embodiment, the "n" PCIe drives may process in parallel the mapped logical commands that were written in the single queue. In an embodiment, the FPGA is configured to implement the mapping of the logical command entries by performing drive level logical separations to make sure that attributes of each of the mapped logical commands are observed. In this case, the FPGA may act as a host and an intelligent router between the single submission queue slot and the processing drives.

In a preferred embodiment, the different PCIe drives may be configured as RAID 5 array. In this case, a RAID stride in the PCIe drives may be configured to process in parallel the logical command entries of the command stride. In this embodiment, the number of logical command entries in any given command stride may be equal to or less than the number of RAID drives as long as the mapping for each logical command entry is observed. For example, for three RAID drives, the number of logical command entries may be three or less. For five RAID drives, the number of logical command entries may be five or less than five, and so on. In other embodiments, the different PCIe drives may be implemented as a RAID 6 array, or other types of RAID that features a parallel processing of the logical command entries.

In an embodiment, the FPGA 140 is configured as an inline accelerator that utilizes the control logic 142 to control I/O operations of the FPGA 140. The control logic 142 includes a management CPU 210 that is communicatively coupled to a bus bridge 212 and to the FPGA random access memory (RAM) virtual host controller interface 214. FPGA RAM virtual host controller interface 214 is communicatively coupled to a host virtual endpoint 216. Management CPU 210 is further coupled to an external memory 230. Host virtual endpoint 216 is coupled to root complex device 136, which is coupled to processor 102 and system memory 110. Host virtual endpoint 216 is also coupled to a PCIe transaction replicator 218. In one embodiment, system memory 110 can store NVMe queues 240. In this embodiment, the NVMe queues 240 may include submission queue slots 242 and 244. Furthermore, NVMe queues 240 may include command strides 250 and 255 that are stored in submission queue slots 242 and 244, respectively. The submission queue slot is a circular buffer with a fixed slot size that the host software uses to submit the NVMe command or commands.

Each of the stored command strides may include NVMe commands that are logically grouped to form a logical command stride in the single queue. From the point of view of the host, each NVMe command is treated as a logical command entry with a particular logical address. In an embodiment, multiple logical command entries may be grouped in a single submission queue slot to form one command stride. For example, the command stride 250 includes three logical commands that are entered or indexed in a first logical entry 251, second logical entry 252, and third logical entry 253, respectively. In another example, a command stride 255 includes three logical commands that are entered or indexed in a fourth logical entry 256, fifth logical entry 257, and sixth logical entry 258, respectively. In these examples, the number of logical command entries in each command stride may correspond to the number of drives in the RAID array. In a case where a particular RAID drive is not expected to work on the logical command of a particular command stride, a no-response command may be issued to make sure that the particular RAID drive stops from doing I/O related operations. The no-response command, for example, includes a no-op command of the NVMe specification.

Host virtual endpoint 216 is a pseudo endpoint for the processor 102. In an embodiment, the host virtual endpoint 216 is configured as the single PCIe endpoint that is utilized by the accelerator to advertise the "n" number of drives in the RAID array where n=3 in the illustrated embodiment. In this embodiment, the processor is aware that it can write three logical command entries in one command stride and the processor may map each logical command entry to target each of the three drives. This mapping of the logical command entries, however, may require drive level logical separation because each logical command entry may be indexed in a logical address that does not correspond to a namespace address of the target drive. In this regard, a mapper 220 is configured to shift the logical address to match the namespace address of the target drive during downstream PCIe transactions. This drive level logical separation is implemented due to the use of the single PCIe endpoint in the advertising of the three drives. The processor perceives the single PCIe endpoint and receives the namespace addresses but the processor is not aware of the logically separated configurations of the three drives that correspond to the namespace addresses.

The host virtual endpoint 216 is further coupled to the mapper 220 that may be configured to facilitate downstream PCIe transactions to PCIe devices 270, 280, and 290. The mapper 220 is also configured to facilitate upstream PCIe transactions to the processor or system memory. For example, the mapper 220 may act as a command fetch mapper, queue mapper with regard to a command response from the system memory, and a completion status mapper for the PCIe devices. In this example, the processor 102 may be configured to coalesce the completion status and interrupts for a particular command stride. For example, the processor coalesces the three interrupts, which correspond to the three logical commands of the command stride 250, to generate a single interrupt. Similarly, the processor coalesces the next three interrupts, which correspond to the three logical commands of the command stride 255, to generate another interrupt. In these examples, the latency in processing of the interrupts during parallel data processing in the RAID 5 array is decreased.

Mapper 220 is coupled to the bus bridge 212 and to root ports 222 and 224. Each of the root ports 222 and 224 is further coupled to bus bridge 212 and the PCIe transaction replicator 218. Root port 222 is also coupled to PCIe devices 270 and 280, and root port 224 is also coupled to PCIe device 290. In another embodiment, the FPGA 140 utilizes a single root port rather than multiple root ports, such as the root ports 222 and 224. In this other embodiment, the single root port may include a switching topology that facilitates selection of the PCIe device that transacts with the processor or the system memory through the host virtual end point 216. For example, the single root port is a sixteen lane (×16) root port. In this example, the ×16 single root port may support multiple PCIe devices 270, 280, and 290, behind the single virtual end point 216.

During data transmission between the processor 102 and the PCIe devices 270, 280, and 290, the mapper 220 as hardware logic may be configured to implement the drive level or queue level logical separation of the mapped logical command entries from the host virtual endpoint 216 to the RAID drives. In another embodiment, the management CPU 210 may be configured to implement the drive level or queue level logical separation of the mapped logical command entries. In this other embodiment, the management CPU 210 is aware that the queues may be logically separated from one another because they are located in separate drives. By using the single PCIe endpoint to advertise these queues and their corresponding namespaces, the processor sees the single PCIe endpoint and configures the mapping of logical commands based on the namespaces and not from the logical separation of the drives or the supported queues. In this regard, the mapper 220 or the management CPU 210 is configured to observe proper attributes of each mapped logical command entry.

PCIe device 270 supports a first queue namespace 272, the PCIe device 280 supports a first queue namespace 282 and the PCIe device 290 supports a first queue namespace 292. Each of these namespaces represents an advertised queue. Furthermore, each namespace may be used to identify the PCIe drive in the RAID array. The first queue namespace 272, for example, is a namespace that is associated with the single queue that is supported by the PCIe device 270. In this example, a namespace label describes the attributes of this associated namespace. The attributes may include a physical address of the PCIe device that supports the queue, namespace address of the queue, range of logical block addresses of the queue, number of queue or queues that are supported by the PCIe device, and the like. The other queue namespaces 282 and 292 are similarly treated as namespaces that are associated with the corresponding queues that are supported by the corresponding PCIe devices. In the preferred RAID 5 embodiment, two of the PCIe devices 270, 280, and 290 may be configured to store data while the third PCIe device may be configured to store parity data. For this preferred embodiment, the PCIe devices can be NVMe devices. In other embodiment, the PCIe devices can be graphics processing units or remote direct memory access network interface cards that interact with the processor or system memory through the single PCIe end point.

In an embodiment, the FPGA 140 through the management CPU exposes or advertises three queues (n=3) from three different drives to the processor 102 via the host virtual endpoint 216 as the single PCIe endpoint. The advertising includes sending the namespaces of the corresponding queues to the processor 102. The presented three queues are distributed across the PCIe devices that are coupled to the FPGA. In this embodiment, the coupled PCIe devices are in physical communication with the processor and are expected to work on the one or more commands that are stored in the NVMe queues of the system memory 110.

For example, the PCIe devices 270, 280, and 290 are coupled to the FPGA 140 through the root ports 222 and 224. Each of the PCIe devices 270, 280, and 290 supports a single queue. Each of these three queues may be identified through their associated namespaces. In this example, the FPGA 140 may advertise the three queues and their corresponding namespaces to the processor 102 through the single host virtual endpoint 216. Based on the advertised namespaces, the processor 102 may write multiple commands strides where each command stride includes a number of logical commands that correspond to the number of different drives. In the illustrated embodiment, two command strides are written for ease of illustration.

In an embodiment, the processor 102 acknowledges the three drives that may process three logical command entries in parallel. In this embodiment, the processor 102 may write the command strides 250 and 255. These command strides, for example, are written to perform RAID parity calculation on account of a new data (D') to be written in the PCIe device 270. In this example, by using a "read-modify-write" method for RAID parity data calculation, the processor writes the first command stride 250 to perform read operations that are used to calculate a new parity data (Pnew). Thereafter, the processor may write and use the command stride 255 to perform write operations to update data in the drives.

For example, the processor writes the command stride 250 to include a read data of the PCIe device 270, a no-response command to the PCIe device 280, and a read parity data of the PCIe device 290. In this example, the processor performs an XOR operation on the data of the PCIe device 270, the new data (D'), and the parity data to generate a new parity data (Pnew).

In an embodiment, the processor 102 may send a single doorbell to the PCIe device 270. The doorbell indicates presence of the new command stride in the first submission queue slot of the system memory 110. In this embodiment, the PCIe transaction replicator 218 is configured to intercept the single doorbell and duplicates the doorbell based on the number of drives in the RAID array. The PCIe transaction replicator may then send one doorbell for each drive. At this stage, however, each drive in the RAID array is not aware that the doorbell corresponds to a group of logical command entries in the submission queue slot 242.

In an embodiment, each of the PCIe devices 270, 280, and 290 sends a command fetch to the system memory 110. From the point of view of each PCIe device, it is sending the command fetch that corresponds to the command in the first submission queue slot 242 of the system memory. In this embodiment, the mapper 220 is configured to intercept the command fetchs and perform the logical separations based on the mapping of each logical command. For example, the logical addresses of the command fetchs from the PCIe devices 270, 280, and 290 are manipulated by the mapper in order to route these command fetchs to the first logical entry 251, second logical entry 252, and third logical entry 253, respectively. In this example, the mapper 220 may facilitate the sending of the command fetchs to corresponding logical entry addresses in the system memory 110. In another embodiment, the management CPU performs the logical separations based on the mapping of each logical command.

In an embodiment, the system memory 110 is configured to send the command responses to corresponding PCIe devices. The command responses are taken from the command stride 250 that includes three logical command entries. For example, the command responses may include the read data of the PCIe device 270, a no-response command to the PCIe device 280, and a read parity data of the PCIe device 290. In this example, the mapper 220 may intercept the three command responses and perform the drive level logical separations to make sure that the attributes of each command response are observed. The attributes may include the proper drive in the RAID array that will process the mapped logical command.

In an embodiment, the management CPU 210 may process the completion status from the PCIe devices 270 and 290, and disregards the response or completion status from the PCIe device 280. In this embodiment, the mapper will again manipulate the addresses of the completion status from the PCIe devices 270 and 290 in order to observe the attributes of the mapped logical commands in the command stride 250. In an embodiment, the processor 102 may coalesce the completion status and interrupt from the PCIe devices 270 and 290 before sending the second doorbell that corresponds to the second command stride 255.

In an embodiment, the processor 102 may send a second doorbell to the PCIe device 280. The doorbell indicates presence of the second command stride 255 in the second submission queue slot 244 of the system memory 110. In this embodiment, the PCIe transaction replicator 218 is configured to intercept the doorbell and duplicates the doorbell based on the number of advertised drives. The PCIe transaction replicator may then send one doorbell to each drive. At this stage, however, each drive in the RAID array is not aware that the doorbell corresponds to a group of logical command entries in the submission queue slot 244.

In an embodiment, each of the PCIe devices 270, 280, and 290 will again send a command fetch to the system memory 110. From the point of view of each PCIe device, it is sending the command fetch that corresponds to the command in a second queue of the system memory. In this embodiment, the mapper 220 is configured to intercept the command fetchs and perform the logical separations based on the mapping of each logical command in the command stride 255. For example, the logical addresses of the command fetchs from the PCIe devices 270, 280, and 290 are manipulated by the management CPU in order to route these command fetchs to the fourth logical entry 256, fifth logical entry 257, and sixth logical entry 258, respectively. In this example, the mapper 220 may facilitate the sending of the command fetchs to corresponding logical entry addresses in the system memory 110.

In an embodiment, the system memory 110 is configured to send the command responses to corresponding PCIe devices. The command responses are taken from the command stride 255 that includes three logical command entries. For example, the command responses may include the write new data (D') to the PCIe device 270, a no-response command to the PCIe device 280, and a write new parity data (Pnew) to the PCIe device 290. In this embodiment, the mapper 220 will again intercept the three command responses and performs the drive level logical separations to make sure that the attributes of each command response are observed. The attributes may include the proper drive that will process the mapped logical command.

In an embodiment, the management CPU 210 may process the completion status from the PCIe devices 270 and 290, and disregards the response or completion status from the PCIe device 280. In this embodiment, the mapper 220 will again manipulate the addresses of the completion status from the PCIe devices 270 and 290 in order to observe the attributes of the mapped logical commands in the second command stride 255. In an embodiment, the processor 102 may coalesce the completion status and interrupt from the PCIe devices 270 and 290 before sending another doorbell for a subsequent third command stride.

Accordingly, by grouping the logical commands in a single command stride in a single queue, and by configuring the FPGA to act as intelligent router for the mapped logical commands, the FPGA facilitates increase in efficiency of the I/O operations in the IHS.

Figure 3:
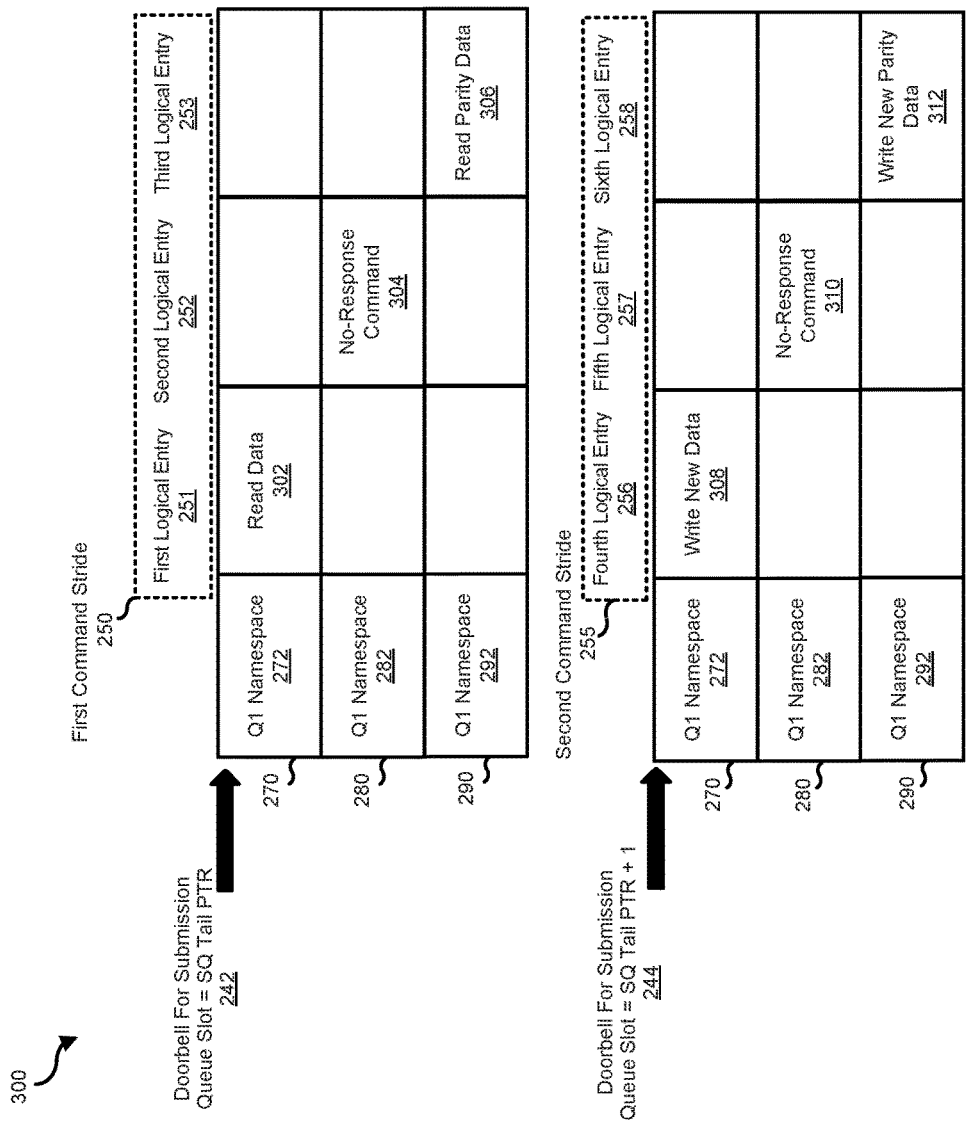
FIG. 3 is a table showing a mapping of logical command entries for different command strides as configured by a processor, according to an embodiment of the present disclosure.

FIG. 3 shows a command mapping 400 that includes the mapping of logical command entries in a RAID parity calculation. In an embodiment, for the RAID 5 parity data calculation, the processor 102 may write the first command stride 250 to calculate the new parity data in the PCIe device 290, which is configured to store the parity data on a first RAID stride. In this embodiment, the indexed logical commands in the command stride 250 may include a read data 302 of the PCIe device 270, a no-response command 304 for the PCIe device 280, and a read parity data 306 of the PCIe device 290. The PCIe devices 270 and 280, for this RAID stride, are configured to store data. Furthermore, the namespace addresses 272, 282, and 292 may indicate logical address of the RAID drives that perform parallel processing of logical command entries of the command stride 250.

In an embodiment, the processor 102 may use one doorbell for the command stride 250. In this embodiment, the doorbell is replicated and sent to each of the PCIe drive in the RAID array. In response to the received doorbell, each of the PCIe drives may send a command fetch. Based on received command fetchs, the system memory 110 sends the first command stride 250 that includes the read data 302, no-response 304, and the read parity data 306 to the PCIe devices 270, 280, and 290, respectively. After processing by the PCIe drives of these logical commands, each of the PCIe drives may send the completion status. In an embodiment, the management CPU 210 may be configured to disregard the completion status from the PCIe device 280 while the completion status from the PCIe devices 270 and 290 are allowed through the mapper 220 to be processed by the processor. In this embodiment, the processor may process the received completion status by batch. In other words, the processor may be configured to wait first for the completion status and interrupts from the PCIe devices 270 and 290 to arrive before integrating the interrupts to form a single interrupt for the command stride 250.

In an embodiment, the processor 102 writes the command stride 255 as a subsequent step for the RAID 5 parity calculation. The command stride 255 may be used to write the new data and new parity data to the PCIe devices 270 and 290, respectively. In this embodiment, the indexed logical commands in the command stride 255 may include write new data 308 to overwrite the data in the PCIe device 270, a no-response command 310 to the PCIe device 280, and a write new parity data 306 to PCIe device 290.

In an embodiment, the processor 102 may use a second doorbell notification for the command stride 255. In this embodiment, the doorbell is replicated and sent to each of the PCIe drives. In response to the received doorbell, the command fetchs from the PCIe devices 270 and 290 are processed in the system memory while the command fetch from the PCIe device 280 is disregarded by the management CPU. Based on received command fetchs, the system memory 110 sends the second command stride 255 that includes the write new data 308, no-response command 310, and write new parity data 312 to the PCIe devices 270, 280, and 290, respectively. After processing of the logical commands, each of the PCIe devices 270, 280, and 290 may send completion status. The accelerator may disregard the completion status from the PCIe device 280 while it allows the completion status from the PCIe devices 270 and 290 to be processed by the processor. In an implementation, the processor will process the completion status by batch. In other words, the processor may be configured to wait first for the completion status and interrupts to arrive and then integrate the interrupts as a single interrupt for the second command stride 255. In this manner, the accelerator generates a single interrupt for every command stride.

In an embodiment, the processor 102 may be configured to use unused bits in the doorbell signaling. In this embodiment, work notification is served to multiple consumers using a single doorbell notification.

Figure 4:
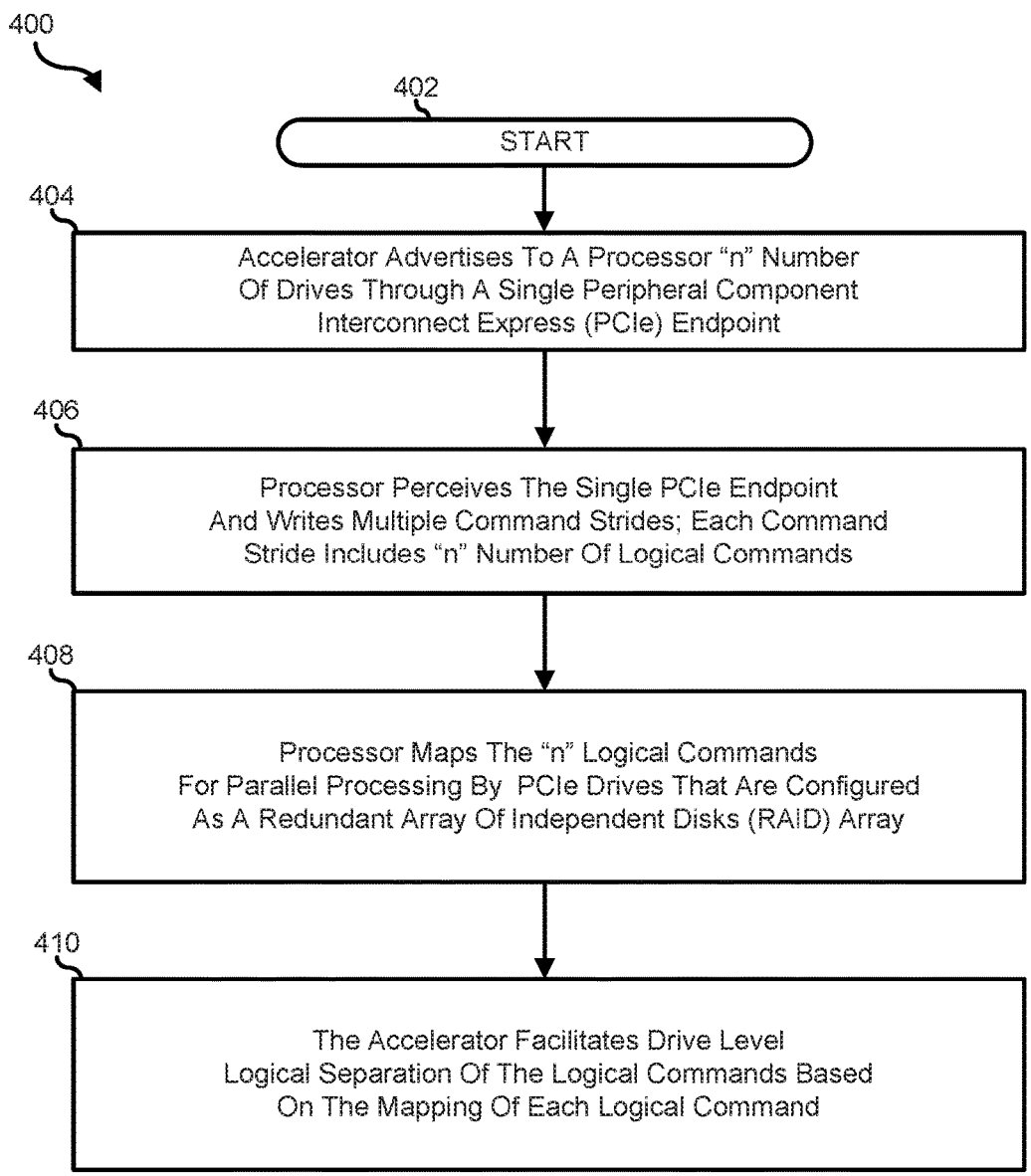
FIG. 4 is a flow chart showing a method of increasing efficiency in the information handling system by configuring the FPGA to perform drive level logical separation based on a mapping of each logical command entry, according to an embodiment of the present disclosure.

FIG. 4 shows a method 400 of increasing efficiency during the I/O transaction operation on the information handling device, starting at block 402. At block 404, the FPGA 140 advertises "n" number of drives using the host virtual endpoint 216 as the single PCIe endpoint. At block 406, the processor 102 perceives the use of the single PCIe endpoint and writes multiple command strides where each command stride includes "n" number of logical commands. At block 408, the processor 102 maps each of the "n" logical commands to target a particular drive. At block 410, the FPGA 140 acts as a host to the PCIe devices and facilitates logical separation of each drive based on the mapping of the logical commands.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a plurality of peripheral component interconnect express (PCIe) drives;
   a processor in physical communication with the PCIe drives, the processor configured to write a first command stride and a second command stride, wherein each of the first command stride and the second command stride includes a plurality of logical commands in a single queue, wherein each of the logical commands is mapped for parallel processing by the PCIe drives;
   a hardware logic device (HLD) that advertises the PCIe drives to the processor using a single PCIe endpoint, the HLD configured to:
      perform a logical separation of the logical commands based on the mapping of each logical command.

2. The information handling system of claim 1, wherein the processor is configured to use a doorbell for each of the first command stride and the second command stride.

3. The information handling system of claim 2, wherein the HLD further includes a PCIe transaction replicator that is configured to intercept the doorbell and to duplicate the doorbell based on a number of the PCIe drives that will receive the doorbell.

4. The information handling system of claim 1, wherein the logical separation includes a modification of a register address of the mapped logical command to match a namespace address of the PCIe drive.

5. The information handling system of claim 1, wherein the processor maps the logical commands based in namespaces of the PCIe drives.

6. The information handling system of claim 5, wherein the advertising includes sending of a namespace that describes a physical address of the PCIe drive, a namespace address of a queue supported by the PCIe drive, a range of logical block addresses of the queue, and a number of the queues that are supported by the drive.

7. The information handling system of claim 1, wherein the advertised PCIe drives are configured as a redundant array of independent disks (RAID) 5 array.

8. The information handling system of claim 7, wherein the processor uses the first command stride to calculate a new parity data, wherein the processor uses the second command stride write the calculated new parity data.

9. The information handling system of claim 1, wherein the HLD further comprises:
   a management central processing unit (CPU) that performs the logical separation of the logical commands;
   a mapper configured to: intercept a command fetch from each of the PCIe drives; and act as a command fetch mapper after the performing of the logical separation by the management CPU.

10. A method, comprising:
    writing, by a processor, of a first command stride and a second command stride, wherein each of the first command stride and the second command stride includes a plurality of logical commands in a single queue, wherein each of the logical commands is mapped for processing by a peripheral component interconnect express (PCIe) drive; and
    performing, by an accelerator, a logical separation of the plurality of logical commands based on the mapping of each logical command, wherein the plurality of logical commands are processed in parallel by the PCIe drives.

11. The method of claim 10 further includes: using a doorbell for each of the first command stride and the second command stride.

12. The method of claim 11 further including: intercepting and duplicating, by a PCIe transaction replicator, of the doorbell based on a number of the PCIe drives that will receive the doorbell.

13. The method of claim 10, wherein the logical separation includes a modification of a register address of the mapped logical command to match a namespace address of the PCIe drive.

14. The method of claim 10 further includes: advertising, by the accelerator, the PCIe drives to the processor through a single PCIe endpoint.

15. The method of claim 14, wherein the advertised PCIe drives are configured as a redundant array of independent disks (RAID) 5 array.

16. The method of claim 15, wherein the processor uses the first command stride to calculate a new parity data, wherein the processor uses the second command stride write the calculated new parity data.

17. The method of claim 15, wherein the advertising includes sending of a namespace that describes a physical address of the PCIe drive, a namespace address of a queue supported by the PCIe drive, a range of logical block addresses of the queue, and a number of the queues that are supported by the drive.

18. An information handling system, comprising:
    a redundant array of independent disks (RAID) array that includes a plurality of peripheral component interconnect express (PCIe) drives;
    a processor in physical communication with the PCIe drives, the processor configured to write a first command stride and a second command stride, wherein each of the first command stride and the second command stride includes a plurality of logical commands in a single queue, wherein the plurality of logical commands is mapped for parallel processing by the PCIe drives;
    an accelerator coupled to the processor, the accelerator configured to:
       perform a logical separation of the plurality of logical commands based on the mapping of each logical command.

19. The information handling system of claim 18, wherein the plurality of logical commands in the single queue are directed to multiple PCIe drives.

20. The information handling system of claim 18, wherein the processor is configured to use a single doorbell for the single queue.

* * * * *